J. M. BROWN.
GATE VALVE.
APPLICATION FILED APR. 12, 1905.

903,354.

Patented Nov. 10, 1908.

WITNESSES
R A Balderson
Warren W Swartz

INVENTOR
James M. Brown
by Darlenes Baynes
his attys

UNITED STATES PATENT OFFICE.

JAMES M. BROWN, OF MANSFIELD, OHIO.

GATE-VALVE.

No. 903,854.

Specification of Letters Patent.

Patented Nov. 10, 1908.

Application filed April 12, 1905. Serial No. 255,120.

*To all whom it may concern:*

Be it known that I, JAMES M. BROWN, of Mansfield, Richland county, Ohio, have invented a new and useful Gate-Valve, of which the following is a full, clear, and exact description, reference being had to the accompanying drawings, forming part of this specification, in which—

Figure 2:
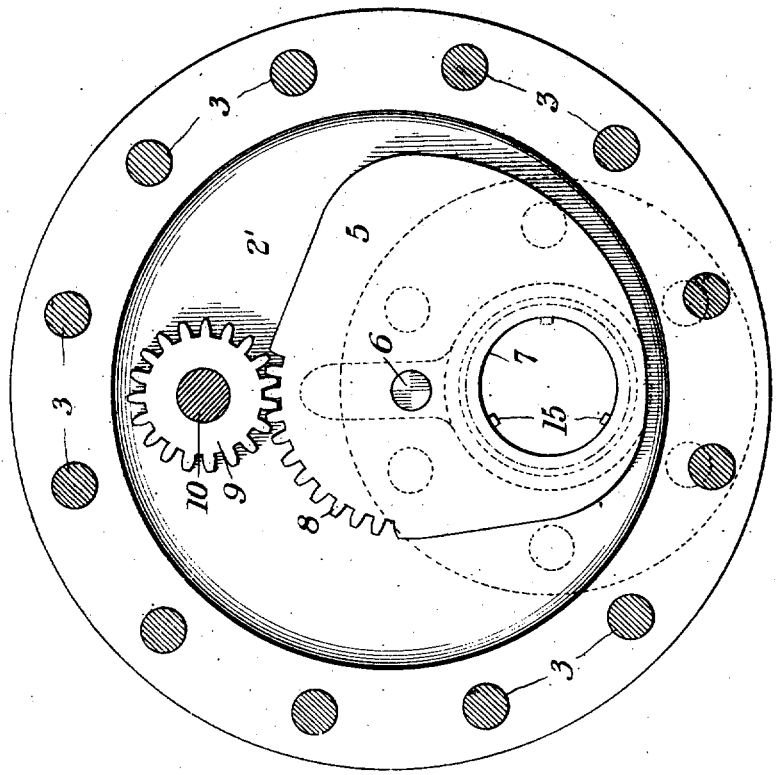
Figure 1:
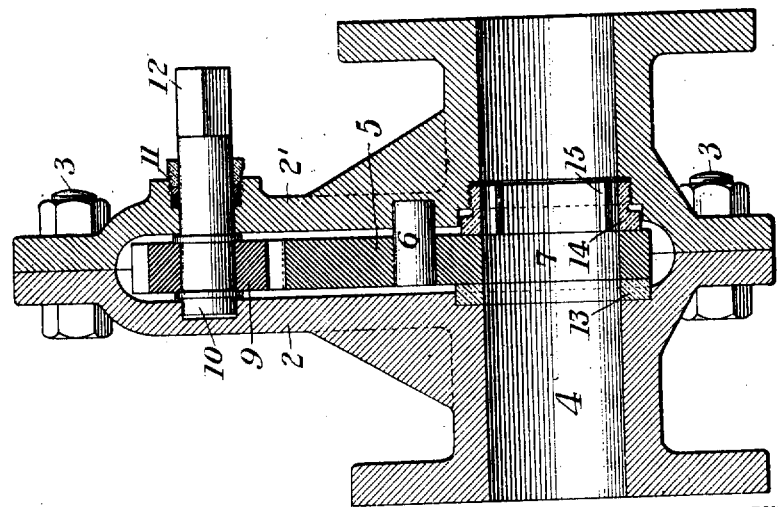

Figure 1 is a central section of my improved valve; and Fig. 2 is an end view with one half of the casing removed.

My invention relates to the class of gate valves, and is designed to provide an improved valve of this character, wherein the valve shall be in perpetual contact with its seat at all times whether in open or closed position.

The object of the invention is to provide an improved valve in which the operating mechanism is protected from any material carried by the fluid held in check or passing through the valve; also to provide the valve with two seats, one of which is stationary and the other adjustable; and to do away with all cushions, the valve being of metal and seating against metal at all times.

In the drawings, in which I have shown my invention as applied to a blow-off valve, I show a valve casing made in two parts, 2 and 2' having circumferential flanges secured together by bolts 3. These two parts are recessed in their meeting faces to provide a valve chamber which is preferably circular in form as shown, and is eccentric to the passageway 4 extending through the casing.

The valve 5 consists of a plate or disk of lobe shape of slightly less thickness than the width of the valve chamber and eccentrically pivoted upon the pin 6. The valve is preferably loosely mounted on this pin which projects into one half of the valve casing. The valve is provided with a circular opening 7 arranged to be brought into registry with the passageway 4, the solid portion of the valve being arranged to close the port when the valve is turned.

In order to turn the valve upon its axis, I preferably provide it with an arc-shaped rack 8, the pitch line of the teeth being concentric with the axis 6. These teeth are engaged by a pinion 9, preferably of the same thickness as the valve disk and mounted in the valve chamber, this pinion being secured to a stub-shaft 10 which projects through a stuffing-box 11 in the face of the casing, and is provided with an angular stem 12.

The seats for the valve comprise a stationary removable metallic ring 13 and an adjustable metallic ring 14 having an externally screw-threaded portion engaging a correspondingly inner screw-threaded portion in one of the casing halves. The ring or bushing 14 is preferably provided with inner projections 15 to receive a spanner for adjusting it. The adjustable seat is adjusted so that there is sufficient pressure upon the valve disk to seal it.

It will be noted that when the valve is turned into either position there is a perpetual contact between the valve disk and the metallic valve seats on both sides. No elastic packing for the valve is employed, the thickness of the closing portion of the valve being the same as the thickness of the apertured portion, and the valve being plane-faced on both sides in that portion which moves over the valve seats.

The advantages of my invention result from protecting the operating mechanism from the action of the fluid or substances contained therein, also from the compact arrangement of the same. The use of the metallic disk which is in continuous contact with two seats avoids all cushion contact and gives perpetual metallic contact with metal to metal joints.

Variations may be made in the form and arrangement of the metallic valve rings or bushings, the valve disk and the other parts without departing from my invention.

I claim:—

In a gate valve, a casing made in two divided halves with an eccentric valve chamber between them, said parts having a passageway extending through the chamber, a plate valve pivoted in the chamber and having a hole arranged to register with the passageway, a pair of metallic seat rings held in perpetual rigid contact with the plate, at least one of said rings being adjustable, and a toothed wheel within the chamber arranged to oscillate the valve plate; said wheel being at the same side of the passageway as the pivot of the valve and in the plane of the valve substantially as described.

In testimony whereof, I have hereunto set my hand.

JAMES M. BROWN.

Witnesses:
 BEN HURXTHAL,
 A. F. BLACK.